United States Patent

Chahley et al.

[11] Patent Number: 5,950,926
[45] Date of Patent: Sep. 14, 1999

[54] SPRAYER BOOM LOCK VALVE FOR SEQUENCING UNFOLDING STEPS

[75] Inventors: Dennis W. Chahley, Martensville; Phillip A. Reiber, Saskatoon, both of Canada

[73] Assignee: Flexi-Coil Ltd., Saskatoon, Canada

[21] Appl. No.: 08/964,232

[22] Filed: Nov. 4, 1997

[51] Int. Cl.$^6$ .............................. B05B 1/20; B05B 3/02; F15B 15/20

[52] U.S. Cl. .................... 239/159; 239/161; 239/164; 239/166; 239/167; 91/358 A; 91/392

[58] Field of Search ................. 91/358, 392; 239/159, 239/161, 164, 166, 167, 172, 176

[56] References Cited

U.S. PATENT DOCUMENTS

| | | | |
|---|---|---|---|
| 4,739,930 | 4/1988 | Pask | 239/161 |
| 4,944,355 | 7/1990 | Karchewski | 172/278 |
| 5,029,757 | 7/1991 | Bourgault et al. | 239/167 |
| 5,154,240 | 10/1992 | Carrick | 239/167 X |
| 5,178,328 | 1/1993 | Broyhill | 239/167 X |
| 5,630,547 | 5/1997 | Klemenhagen et al. | 239/161 |

*Primary Examiner*—Andres Kashnikow
*Assistant Examiner*—Robin O. Evans
*Attorney, Agent, or Firm*—Griffin, Butler, Whisenhunt & Szipl, LLP

[57] ABSTRACT

The present invention relates to a sprayer boom lock valve for automating the setup sequence for sprayer operation from the transport position. The lock valve comprises a lever, spring biased toward a valve closing pin, and a cam secured on the secondary boom of the sprayer boom. When the secondary boom is rotated to release wheel locks in the setup sequence, the cam releases the lever which acts on the valve closing pin to close the valve and prevent any further rotation of the secondary boom. The valve is opened again by a linkage which is pulled tight when the sprayer wings are opened, retracting the lever and opening the valve. The hydraulic drive line is then reestablished to complete rotation of the secondary booms. The automated lock valve of the present invention prevents accidental under-rotation of the secondary booms which would be insufficient to release the wheel locks, and also prevents accidental over-rotation which would cause the secondary booms in the transport position to crash into each other damaging the sprayer.

21 Claims, 4 Drawing Sheets

SPRAYER BOOM LOCK VALVE FOR SEQUENCING UNFOLDING STEPS

FIELD OF THE INVENTION

The present invention relates to a sprayer boom lock valve for automated hydraulic sprayer control, particularly for controlling the sprayer setup sequence and a method for controlling the same.

BACKGROUND OF THE INVENTION

Sprayers are trailer devices for applying liquid chemicals to a field surface. The sprayer includes a central cart for supporting the supply tanks and a pair of hinged booms or wings which support nozzles in spaced apart arrangement connected to the supply tank. The nozzles and associated chemical supply lines are carried on a secondary boom rotationally supported on the primary boom at the rear in the operational direction. The primary boom is in rolling contact with the ground on caster wheels and carries all the hydraulic operational drive lines.

The wings are arranged in transverse position in operation to deliver chemical to a wide path with each pass. In operation the nozzles are directed downward toward the ground surface and may be shielded by windscreens. For transportation when not in use, the long wings fold behind the central cart. In transport position, the nozzles, supply lines and windscreens are rotated up above the booms to avoid damage. Hydraulic drive lines powered by the towing tractor are used to operate the setup sequence from transport position to operational position and back.

From an operational position, the folding sequence involves rotating the secondary booms from a downwardly directed position to an upwardly directed position. Once the secondary booms have been raised, the primary booms are folded back into a trailing position with the secondary booms of each side adjacent each other. The booms are aligned closely together to conform to a dimension which can be trailed on the highway. It is essential to raise the secondary boom before closing the primary booms as the close position in transport would cause the secondary booms to crash together. The rotation of the secondary boom thus also assists in adapting the device to a sufficiently narrow transport position.

As the booms close into the trailing position, the wheels are automatically locked in a forward rolling position by a cam which positions a locking pin in cooperating support plates. This is necessary for the booms to trail straight behind the tractor and cart. Depending on the length of the booms the number of wheels will vary. For very long booms, only the intermediate wheels are locked, while the rear wheels are still free to caster.

The setup unfolding sequence to return from a transport position to an operational position first requires the wheels to be unlocked to permit them to freely caster. The wings are advanced to their transverse position by a separate hydraulic drive. Rotation of the secondary boom is then completed to lower it into operational position. For some sprayers without the second hydraulic drive, the wheels have a two stage locking mechanism, which at a first stage is released to caster in a limited angular range. The tractor is then reversed with the controlled wheel positions assisting in opening the wings. Once in position further rotation of the secondary boom releases the wheels to caster freely and lowers the nozzles into operational position.

Since the booms are extremely long and heavy, these sequences of set-up and take-down are powered by hydraulic drive lines from the tractor. For positioning and removing the locking pins for the castor wheels, leverage on the cam for each wheel is obtained simultaneously by hydraulically rotating the secondary booms. However, when the operator is releasing the wheel lock in the transport position, the secondary booms of either side are closely adjacent. If the operator in the tractor misjudges the rotation to release the wheel locks, the secondary booms may be lowered too far and crash into each other. This results in damage to expensive windscreens, nozzles, and supply lines.

Precise positioning is particularly necessary for the two stage wheel locking mechanism and more difficult to judge by eye. While the two stage wheel lock is particularly advantageous for assisting in opening the wings, judging the degree of rotation needed to activate the first release stage, without over-rotating to the second, fully released, stage has proven too difficult to determine visually to take advantage of this type of wheel lock.

Other mechanisms have been proposed, such as U.S. Pat. No. 4,944,355 issued to Karchewski in 1990, for positioning the caster wheels for improved unfolding sequence. This device uses an additional hydraulic cylinder system for positioning the wheels in the setup position. This prior art system adds an additional setup step as well as more expensive and higher maintenance elements. It would be preferred to achieve the wheel positioning mechanically within the setup procedure.

It is desired to provide an apparatus and method to automate the setup steps in the operational sequence to avoid the possibility of error or damage.

It is an object of the invention to provide a mechanism for stopping the rotation of the secondary booms in the transport position once the locking pins have been released.

It is a further object of the invention to provide a means for automating a two stage wheel lock release to facilitate the wing opening step.

SUMMARY OF THE INVENTION

The present invention employs a valve mechanism in the hydraulic drive responsive to the position of the booms, for severing the drive connection once the locking pins have been released, preventing further rotation, and for restoring the drive connection once the booms are in operational position to complete lowering the secondary boom.

Accordingly, the present invention provides a control mechanism in a hydraulic drive line on a sprayer for severing hydraulic power to stop hydraulically controlled movement at a specified position comprising:

valve means;

position responsive actuator means for closing the valve means when a first position is reached; and, position responsive resetting means for opening the valve and re-establishing hydraulic drive for further movement when a second position in reached.

In a preferred embodiment the present invention provides a sprayer boom lock valve on a sprayer including a pair of wings moveable from an aligned transport position to a transverse operational position, each wing including a secondary boom adapted for rotational movement, said sprayer further including at least one pair of caster wheels and associated releasable wheel locks, and a hydraulic control system, said boom lock valve for severing hydraulic power once sufficient rotation has been applied to release the wheel locks comprising:

valve means in the hydraulic control system;

actuator means for closing the valve means and severing hydraulic power when the wheel locks have been released; and, resetting means for opening the valve and re-establishing hydraulic drive for further movement.

In a further preferred embodiment the invention provides a control mechanism in a hydraulic drive line on a sprayer having a pair of wings pivotally moveable from an aligned transport position to a transverse operational position, each wing including a secondary boom adapted for rotational movement by the hydraulic drive line, and at least one wheel mounted for free castering, said control mechanism for automatic positioning of a wheel lock comprising:

wheel lock means for restricting the castering movement of the wheel including locking means having a single position receiving means and a restricted receiving means for a restricted angular range of movement;

lock engaging means for engaging the receiving means of the locking means;

positioning means mounted for rotation on the secondary boom for controlling movement of the lock engaging means having a first rotational position removing the lock engaging means from the single position receiving means and placing the lock engaging means in the restricted receiving means to permit restricted angular movement of the caster wheel, and a second rotational position removing the lock engaging means from the restricted receiving means to permit free castering movement of the caster wheel;

valve means within the hydraulic drive line;

position responsive actuator means for closing the valve means when the positioning means reaches the first rotational position; and, position responsive resetting means for opening the valve and re-establishing hydraulic drive for rotating the positioning means to the second rotational position when the wings of the sprayer approach an operational position.

A preferred method according to the present invention provides a method of opening a sprayer for operation from a transport position to an operational position, said sprayer including a pair of wings moveable from an aligned transport position to a transverse operational position, each wing including a secondary boom adapted for rotational movement, said sprayer further including at least one pair of caster wheels and associated releasable wheel locks, and a hydraulic control system, comprising the steps of:

initiating rotation of the secondary boom to release the mechanical wheel locks;

releasing actuator means for closing a valve in the hydraulic drive line and stopping secondary boom rotation;

moving the wings from an aligned transport position to a transverse operational position;

resetting actuator means to open the valve in the hydraulic drive line; and, continuing rotation of secondary boom to the operational position.

It is an advantage of the present invention that the set-up sequence can be initiated as an automated step preventing inadvertent over-rotation of the booms and possible damage. As an attendant advantage, this operation can be completed from within the tractor without the need for visual monitoring.

It is a further advantage that the boom rotation can be precisely controlled to operate a two stage wheel lock automatically.

Further advantages will be apparent to persons of skill in the art from the following detailed description of preferred embodiments, with reference to the following drawings by way of example only in which:

BRIEF DESCRIPTION OF THE FIGURES

FIG. 2A illustrates a front view of the cam mechanism from line A—A;

Like numerals are used throughout to designate like elements.

DETAILED DESCRIPTION OF PREFERRED EMBODIMENTS

Figure 1:
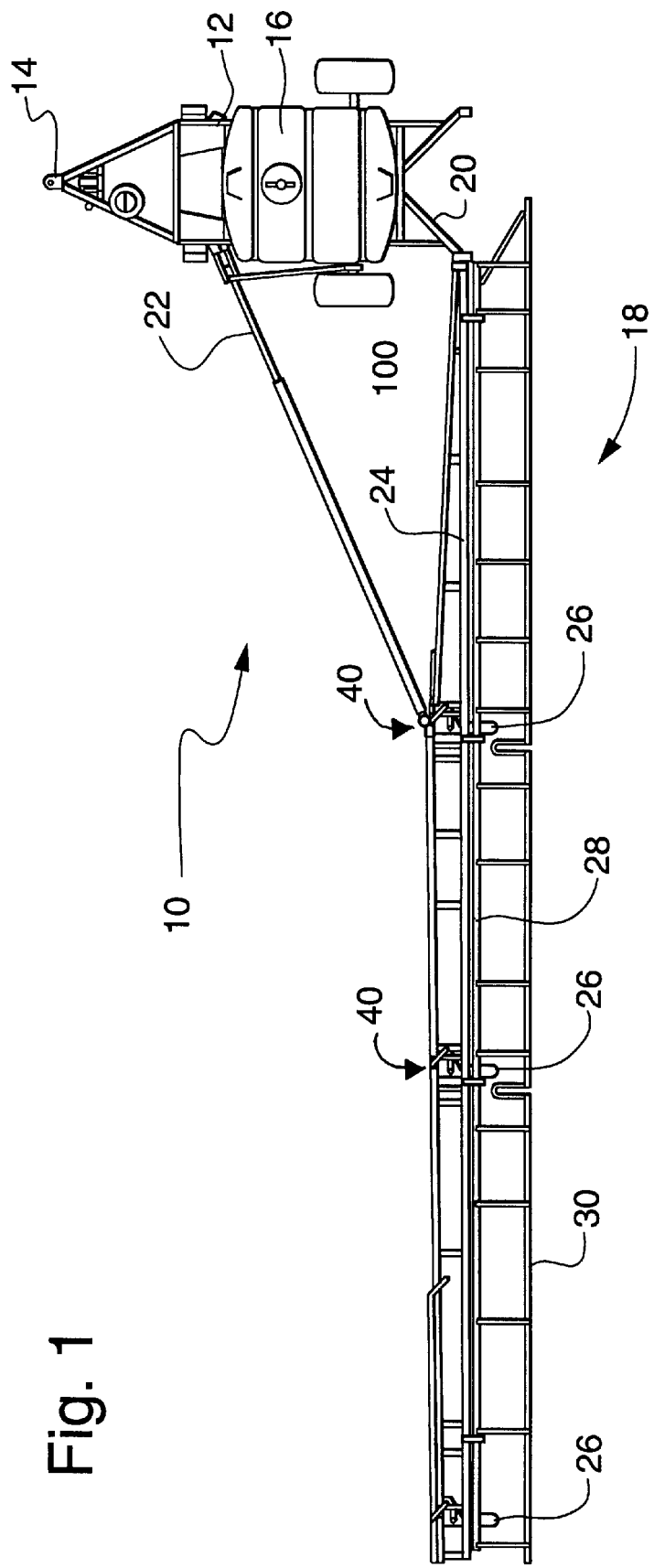
FIG. 1 illustrates a central cart and left boom of a sprayer in plan view in an operational position. The right boom (not shown) is symmetrical to the left and is omitted to increase the available scale of illustration.

The sprayer is shown generally at 10 in FIG. 1. The sprayer 10 includes a central cart 12 with a draw bar and hitch 14 for towing by a tractor. The cart 12 supports supply tanks 16. A pair of wings 18 are pivotally connected to the cart 12 at brackets 20. The right wing (not shown) is symmetrical to the left. Locking arms 22 maintain the wings 18 in transverse operational position as the assembly is towed forward.

Figure 4:
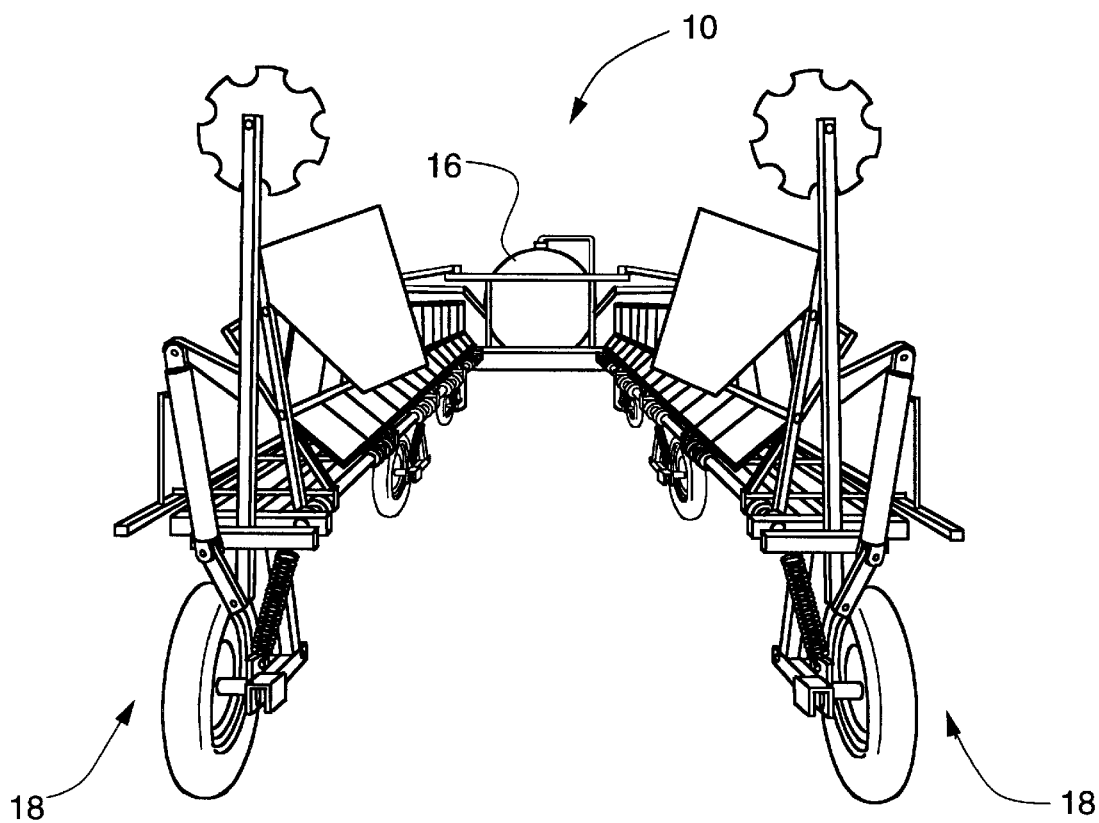

A sprayer is seen from a rear view in FIG. 4 illustrating the close alignment of the right and left wings 18.

The wings 18 consist of a primary boom 24 carried on caster wheels 26 and a secondary boom 28 supported on the primary boom 24 for rotational movement about an axis parallel to the primary boom 24. The secondary boom 28 carries chemical supply lines 30, including spray nozzles spaced at regular intervals and optional windscreens to the rear of the primary boom 24 in the operational direction of travel.

Figure 3:
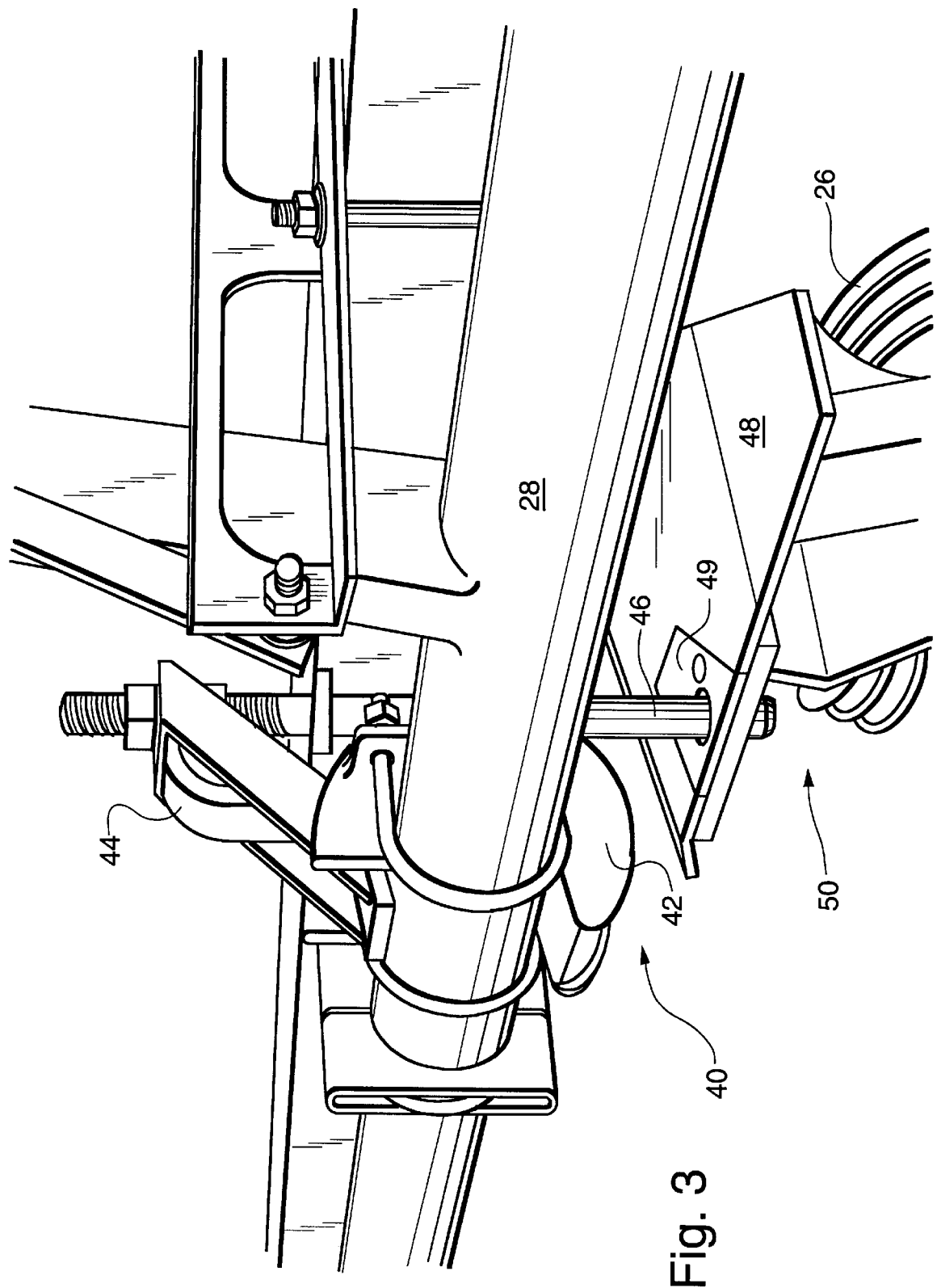
FIG. 3 is an isometric view of a wheel lock.

Some or all of the caster wheels 26 include wheel locks 40, shown in detail in FIG. 3, for locking the wheels 26 in forward rolling position to force the trailing booms 24 to follow straight in the transport position behind the tractor and cart 12. The wheel lock 40 includes a cam 42 secured to the secondary boom 28. As the secondary boom 28 is rotated, the cam 42 acts on follower lever 44 to lift the locking pin 46 from locking plates 48 associated with the wheel mount 50. When the locking pin 46 is raised, wheel 26 is free to caster.

Figure 3A:
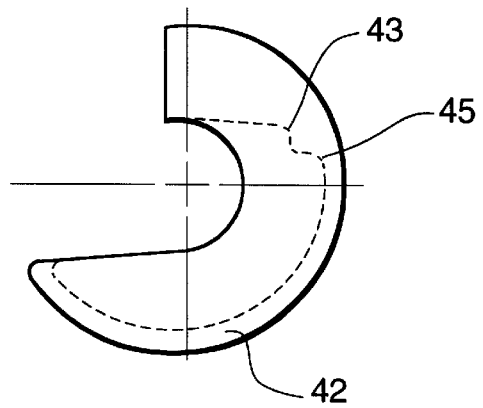
FIG. 3A is a side view of the cam having a stepped profile for two stage operation; and, FIG. 4 is a rear view of a sprayer in the transport position.

On some sprayers, which do not have a hydraulic drive for opening the wings, a two stage wheel lock 40 is employed. A removable portion 49 of the upper locking plate 48 is removed to define a confining angular range for the wheel 26 to caster. The locking pin 46 is raised from the lower locking plate 48 into the opening left by removing portion 49 as a first stage by a first rotational movement of the secondary boom 28 and cam 42, releasing the wheel 26 for limited swivel movement to facilitate opening the wings 18. The cam 42 illustrated in FIG. 3A has a stepped profile (shown in phantom). A first step 43 raises the follower 44 and accordingly pin 46 into the opening 49 for limited caster movement. The tractor and assembly are driven in reverse until the wings 18 open directed by the angular orientation of the wheels 26. Once the wings 18 are fully open, the secondary boom 28 is rotated farther to place the nozzles 30 in operational position, at the same time a cam 42 with a second stepped profile 45 raises the locking pin 46 to second stage releasing the wheel lock 40 completely allowing the wheel 26 to caster freely.

The amount of rotation of the secondary boom 28 required is merely enough to release the wheel lock 40 without over-rotating the booms 28 to the point where they may touch each other. Typically this is a rotation of 30 degrees. In the prior art practice, this angle has been judged by the eye of the operator in the towing tractor. The operator could not see whether the wheel locks 40 had released, so it was then necessary to attempt to proceed in the sequence. If attempts to open the wings were unsuccessful, further rotation of the secondary boom 28 would be necessary. The operator was always at risk, however, of over rotating the secondary booms 28 until, in the close proximity of the transport position, they crash into each other causing expensive damage. The present invention provides a boom lock valve 100 to stop the secondary boom 28 rotation at a specified position once the wheel locks 40 have been released, so over rotation is not possible. This eliminates the guesswork at determining the right amount of movement to proceed with the setup sequence.

In the case of a two stage wheel lock 40 the rotational movement must be significantly more precise. Over-rotation is reached if the wheel lock 40 is not positioned at the first stage. If the wheel lock 40 is inadvertently fully released, the wheels 26 will not be in position to assist the opening process and the steps must be reversed and repeated. This has proven nearly impossible manually. According to the present invention, the boom lock valve 100 may be precisely aligned with the wheel lock cam 42 to stop the secondary boom 28 rotation automatically at the first stage without permitting over-rotation which would release the wheel lock 40 completely.

Figure 2:
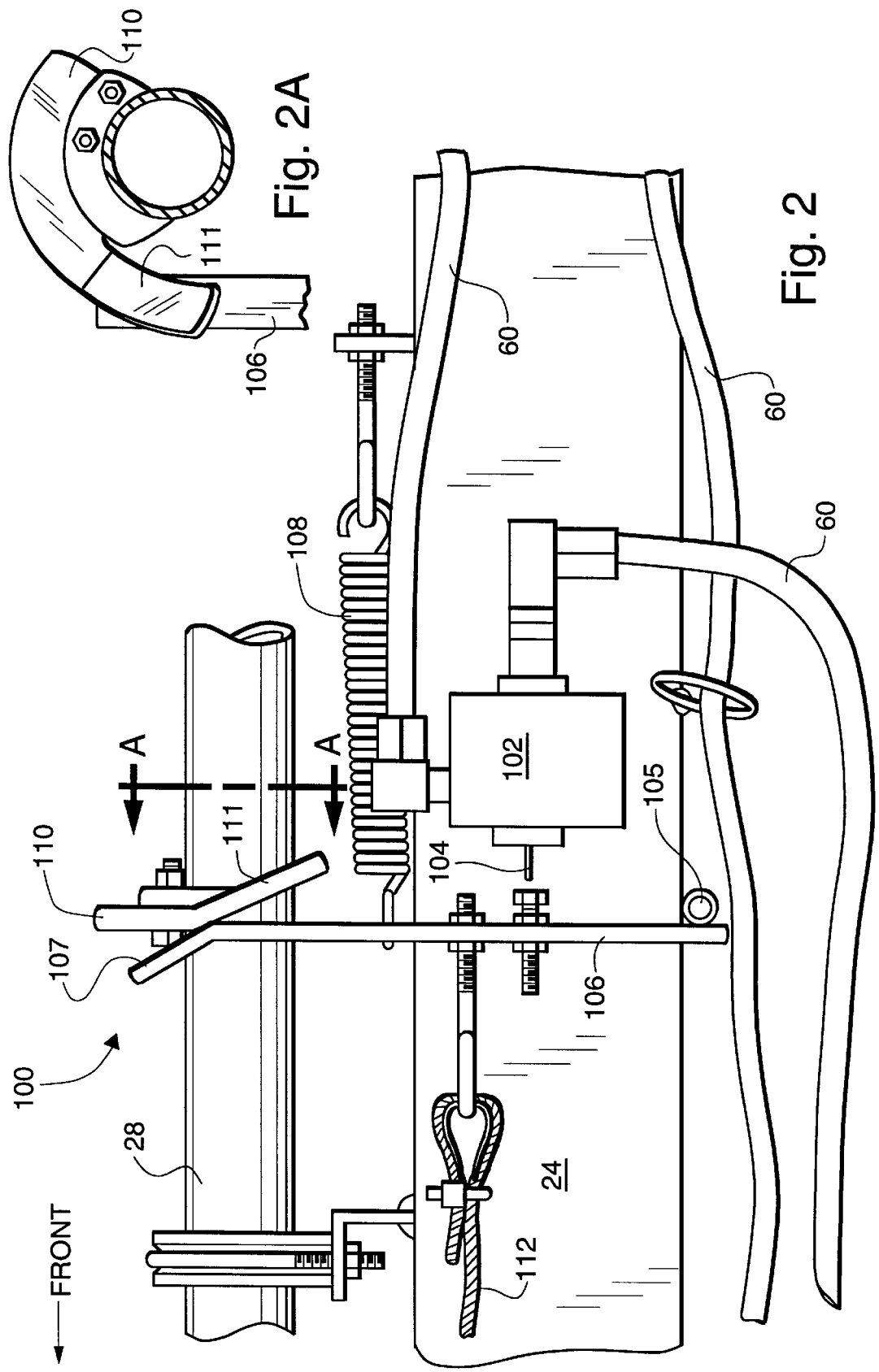
FIG. 2 is a plan view of a preferred embodiment of the sprayer boom lock valve according to the present invention.

The boom lock valve 100, seen in detail in FIG. 2 is also secured to the secondary boom 28 and is responsive to the rotational position of the secondary boom 28. The primary boom 24 supports hydraulic drive lines 60. Typically at least two circuits are used on sprayers, separating boom rotational operation from opening the boom wings for operation. Only the circuit for the rotational actuators is illustrated here.

Hydraulic lines 60 for boom rotation operation include a valve 102. Preferably this is a poppet valve including a projecting actuator pin 104 as illustrated. An actuating lever 106 is moveable pivotally on hinge pin 105 mounted on the primary boom 24 and is biased toward the valve actuator pin 104 by spring 108. A cam 110 is secured for rotation with secondary boom 28. Lever 106 includes an angled surface 107 in sliding engagement with angled surface 111 of cam 110. As secondary boom 28 and cam 110 are rotated, angled surfaces 107 and 111 slide and actuating lever 106 is drawn by the biasing spring 108 against valve actuator pin 104 closing the valve 102 and stopping the rotational drive. Cable 112 is secured to the supporting pivotal bracket 20 at a front end (not shown) and to actuating lever 106 opposite the biasing spring 108. Due to a slight angle between end points of the cable, as the wings 18 are opened to the transverse operational position, the cable 112 is drawn tighter releasing the actuating lever 106 from the actuator pin 104 opening valve 102 and restoring hydraulic drive to the rotational drive line. With hydraulic drive re-established, the nozzles and windscreens 30 can be lowered behind primary boom 24 for operation.

In operation from a transport position hydraulic drive from the tractor (not shown) through lines 60 activates rotation of the secondary booms 28 downward towards each other. After a rotation of approximately 30 degrees, the wheel locks 40 release the wheels 26 to caster freely. Cam 110 rotates with the secondary boom 28. At 30 degrees of rotation the angled surface 111 is positioned against the angled surface 107 of the actuating lever 106 allowing the lever 106 to pivot towards the valve actuator pin 104 biased by the spring 108. The lever 106 depresses the actuator pin 104 and closes the valve 102 in the hydraulic line 60 controlling the rotational movement. The closed valve 102 stops all rotation. The alignment of the boom lock valve 100 is arranged so that the secondary booms 28 cannot rotate beyond a first wheel lock releasing position until the valve 102 is opened again. The wheel lock releasing position may be established at any point sufficient to release the mechanical wheel lock 40, without permitting the secondary booms 28 to touch each other.

With the wheel locks 40 released, the wings 18 are then opened into the transverse operational position by a second hydraulic circuit which rotates the wings 18 into position without backing the assembly. As the wings 18 open, cable 112 or an equivalent linkage, secured between the actuating lever 106 and a fixed point offset from the boom pivot point, is drawn tight, withdrawing the actuating lever 106 from the valve pin 104 and opening the valve 102. Hydraulic drive is thus restored once the wings 18 are filmily open. Locking arms 22 on the cart 12 extend and lock the wings 18 in the transverse operational position. With the wings 18 in position the hydraulic drive 60 is used to lower the secondary booms 28 and nozzles 30 fully to the desired operating position.

Operation of the two stage wheel lock sequence is only slightly different. Rotation of the secondary boom 28 is sufficient to raise the follower 44 onto the first step 43 of the cam 42 and raise the locking pin 46 into an opening 49 for limited movement of the caster wheels 26.

In this position the tractor and sprayer 10 are driven in reverse until the wings 18 open to the transverse position. Again cable 112 is drawn tight as the wings 18 open, withdrawing the actuating lever 106 from the valve pin 104 and opening the valve 102 restoring hydraulic drive. Locking arms 22 on the cart 12 extend and lock the wings 18 in the transverse operational position. The secondary boom 28 is then rotated farther rotating the cam 42 to lift the follower from the first step 43 onto the second step 45 releasing the locking pin 46 from the second stage for free caster movement. Rotation is continued as needed to lower the nozzles 30 to the desired operating position.

Numerous alternative embodiments will be apparent to persons of skill in the art without departing from the spirit and scope of the invention as defined in the claims attached.

What is claimed is:

1. A control mechanism in a hydraulic drive line on a sprayer for severing hydraulic power to stop hydraulically controlled movement at a specified position comprising:

valve means;

position responsive actuator means for closing the valve means when a first position is reached; and, position responsive resetting means for opening the valve and re-establishing hydraulic drive for further movement when a second position is reached.

2. A control mechanism as defined in claim 1, wherein the position responsive actuator is responsive to rotational movement.

3. A control mechanism as defined in claim 2, wherein the rotational movement to which the actuator means is responsive comprises rotation of a secondary boom of the sprayer sufficient to release a wheel lock without allowing die secondary boom to touch elements on an opposite secondary boom.

4. A control mechanism as defined in claim 3, wherein the position responsive actuator includes a cam secured for rotational movement with the secondary boom and an associated lever responsive to rotational movement of the secondary boom when a first position is reached.

5. A control mechanism as defined in claim 4, wherein the lever is biased toward a mechanical valve closing means.

6. A control mechanism as defined in claim 5, wherein the associated lever is mounted for pivotal movement on a primary boom when released by rotation of the cam.

7. A control mechanism as defined in claim 1, wherein the position responsive resetting means is responsive to a second position when opposite wings of the sprayer approach an operational position.

8. A control mechanism as defined in claim 7, wherein the resetting means comprises a cable secured to the lever to act opposite to a biasing at a first end, and secured at a second end to a stationary point on the sprayer spaced from a pivot of the wing for drawing the lever from a valve closing means by moving the wing from a transport position to an operational position.

9. A sprayer boom lock valve on a sprayer including a pair of wings pivotally moveable from an aligned transport position to a transverse operational position, each wing including a secondary boom adapted for rotational movement, said sprayer further including at least one caster wheel and associated releasable wheel lock, and a hydraulic control System, said boom lock valve for severing hydraulic power once sufficient rotation has been applied to release the wheel locks comprising:

valve means in the hydraulic control system;

actuator means for closing the valve means and severing hydraulic power when the wheel lock has been released; and, resetting means for opening the valve and re-establishing hydraulic drive for further movement.

10. A sprayer boom lock valve as defined in claim 8, wherein the actuator means is responsive to the rotational movement of the secondary boom.

11. A sprayer boom lock valve as defined in claim 10, wherein the actuator means comprises a lever for mechanically closing the valve means when rotational movement of the secondary boom has released the wheel lock, and preventing further rotational movement of the secondary boom.

12. A sprayer boom lock valve as defined in claim 11, wherein the actuator means further includes a cam secured to the secondary boom for releasing the lever in response to rotation of the secondary boom.

13. A sprayer boom lock valve as defined in claim 9, wherein the resetting means opens the valve when the wings reach the operational position.

14. A sprayer boom lock valve as defined in claim 13, wherein the resetting means comprises a cable secured at a first end to the lever opposite the valve means and at a second end to a stationary point on the sprayer spaced from a pivot of the wing, for drawing the lever from a valve closing means when the wing is moved from the transport position to the operational position.

15. A sprayer boom lock valve as defined in claim 9, wherein the wheel lock includes a two stage locking mechanism and said boom lock valve is adapted to sever hydraulic power once sufficient rotation has been applied to release the wheel lock in a first position for limited castor movement, without releasing the wheel lock completely or allowing the secondary boom to touch elements on an opposite secondary boom.

16. A control mechanism in a hydraulic drive line on a sprayer having a pair of wings, each pivotally moveable from an aligned transport position to a transverse operational position, each wing including a secondary boom adapted for rotational movement by the hydraulic drive line, and at least one wheel mounted for free castering, said control mechanism for automatic positioning of a wheel lock comprising:

wheel lock means for restricting the castering movement of the wheel including
locking means having a single position receiving, means and a restricted receiving means for a restricted angular range of movement;
lock engaging means for engaging the receiving means of the locking means;
positioning means mounted for rotation on the secondary boom for controlling movement of the lock engaging means having a first rotational position removing the lock engaging means from the single position receiving means and placing the lock engaging means in the restricted receiving means to permit restricted angular movement of the caster wheel, and a second rotational position removing the lock engaging means from the restricted receiving means to permit free castering movement of the caster wheel;

valve means within the hydraulic drive line;

position responsive actuator means for closing the valve means when the positioning means reaches the first rotational position; and, position responsive resetting means for opening the valve and re-establishing hydraulic drive for rotating the positioning means to the second rotational position when the wing of the sprayer approaches an operational position.

17. A control mechanism as defined in claim 16, wherein the wheel lock means comprises:

a first locking plate having a single position receiving means;

a second locking plate having a restricted receiving means for a restricted angular range of movement;

a lock engaging pin for engaging the receiving means of the first and second locking plates; and, a cam and follower for positioning the lock engaging pin mounted for rotation on the secondary boom having a first rotational position removing the lock engaging pin from the single position receiving means of the first locking plate and placing the lock engaging pin in the restricted receiving means of the second locking plate to permit restricted angular movement of the caster wheel, and a second rotational position removing the lock engaging pin from the receiving means of the second locking plate to permit free castering movement of the caster wheel.

18. A control mechanism as defined in claim 17, wherein the position responsive actuator means comprises a releasing cam mounted for rotational movement on the secondary boom and an associated actuating lever biased toward a valve closing means to close the valve means at the same time the cam and follower of the wheel lock reach the first rotational position.

19. A method of opening a sprayer for operation from a transport position to an operational position, said sprayer including a pair of wings moveable from an aligned transport position to a transverse operational position, each wing including a secondary boom adapted for rotational movement, said sprayer further including at least one pair of caster wheels and associated releasable wheel locks, and a hydraulic control system, comprising the steps of:

initiating rotation of the secondary boom to release the mechanical wheel locks;

releasing actuator means for closing a valve in the hydraulic drive line and stopping secondary boom rotation;

moving the wings from an aligned transport position to a transverse operational position;

resetting actuator means to open the valve in the hydraulic drive line; and, continuing rotation of the secondary boom to the operational position.

20. A method as defined in claim 19 wherein the step of initiating rotation of the secondary boom releases the mechanical wheel locks to a first stage permitting restricted angular movement of the caster wheels.

21. A method as defined in claim 20, further including the step of releasing the mechanical wheel locks to a second stage permitting free castering movement simultaneous with the step of continuing rotation of the secondary boom to the operational position.

* * * * *